May 14, 1929.　　M. F. H. GOUVERNEUR　　1,712,557

LINK LINER

Filed April 9, 1925

Patented May 14, 1929.

1,712,557

UNITED STATES PATENT OFFICE.

MINOR F. H. GOUVERNEUR, OF BALTIMORE, MARYLAND, ASSIGNOR TO LOCKE INSULATOR CORPORATION, OF BALTIMORE, MARYLAND, A CORPORATION OF MARYLAND.

LINK LINER.

Application filed April 9, 1925. Serial No. 21,907.

The invention relates to suspension devices for connecting insulators of the Hewlett type.

It is well known that in insulators of the Hewlett type in which interlinking curved passages are provided for the reception of connecting links, it frequently occurs that no matter how true the passages may be when initially formed, they become more or less distorted during firing of the insulator, a condition which results in the formation of high spots. When suspension links are subsequently inserted through these passages for the purpose of connecting the insulators in a string, the high spots must bear the strain of the load instead of the strain being distributed uniformly.

The use of flexible connecting means, such as wire cables or the like, has been experimented with, but in addition to the defect that it is difficult to connect the ends of such members, it has been found that when such members are under strain, they still conform only generally to the shape of the passages and do not conform to minute variations which may occur as the result of the formation of high spots in the link receiving passages on account of distortion during the firing process. As a matter of fact, it is preferable to make use of rigid connecting means such as the links commonly employed, owing to the fact that it is easier to connect the ends thereof but rigid links possess, to a still greater degree, the defect of being incapable of conforming to minute variations in the surface against which they engage. It therefore follows that round rigid links or cables, unless provided with liners, will give only a line contact and hence give a heavy concentration of load under best conditions.

It is with the above facts in view that I have designed the present invention which has for its general object the provision of a liner or cushion adapted for use in connection with a rigid link and of a sufficiently ductile material to accommodate itself to the contour of the surface against which the link is engaged so that the strain will be distributed uniformly over a wide area of the portion of the passage engaged by the liner and danger of fracture of the insulator thereby avoided.

The object of the invention, more specifically stated, is to provide a liner or cushion of ductile metal preferably permanently affixed to or united with a suspension link at the concave side thereof so as to engage the wall of the link receiving passage in an insulator.

Another object of the invention is the provision of a link having a cushioning liner which may form a permanent part thereof, consisting of an alloy possessing sufficient ductility to accommodate itself to surface inequalities in the link receiving passage of an insulator, thereby equalizing the pressure throughout the passage and preventing the concentration of strain at any high spot or spots.

A further object of the invention is to provide a lined or cushioned suspension link in which the cross-sectional configuration is such that the pressure produced by the engagement of the link with the wall of the link receiving passage in an insulator will be such that there will be a tendency to crowd the cushion or lining toward the axis, thereby avoiding chafing and cutting of the lining or cushion by the link.

A still further object of the invention is the provision of a novel mode of treatment whereby the lining or cushion is secured or united to the link.

To the attainment of the foregoing objects and advantages, the invention may consist in the construction and arrangement of parts to be hereinafter more fully described and pointed out in the claims hereunto appended.

In the drawing wherein like reference characters refer to corresponding parts throughout the several views.

Figure 1:
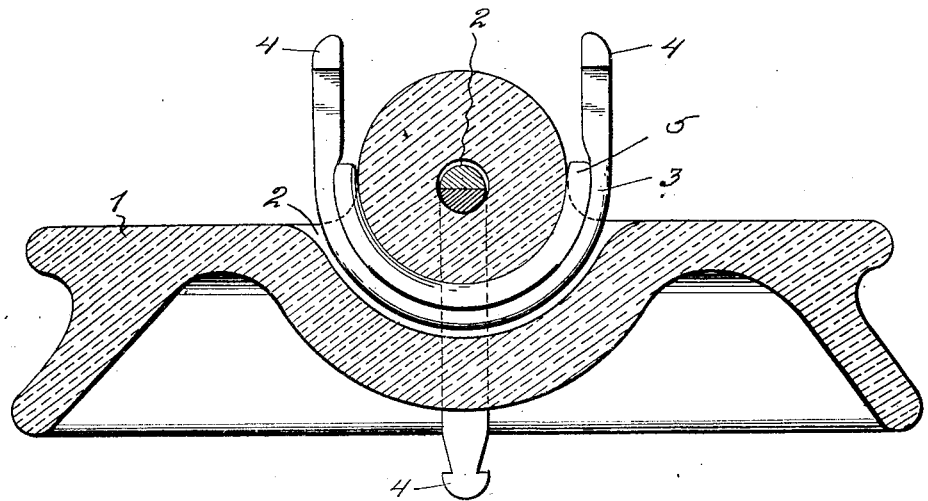
Figure 1 is a vertical section through an insulator of the Hewlett type having interlinking passages substantially circular in cross-section, this view showing a pair of suspension links in position, one link being in elevation and the other in section.
Figure 2:
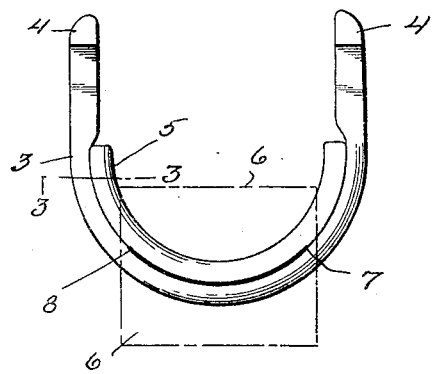
Figure 2 is a side elevation of a link showing the mode of attaching or uniting the cushion or liner thereto.
Figure 3:
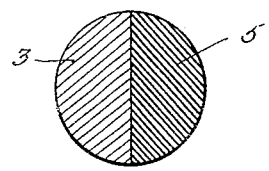
Figure 3 is a detail cross-section through the link and liner, on a larger scale.

Referring to the drawing in detail, I have shown an insulator 1 of what is generally known as the Hewlett type, provided with curved interlinking passages 2 which are or may be substantially circular in cross-section and which are provided for the reception of suspension links such as those illustrated at 3. Ordinarily such links are of substantially U-shape or possibly semicircular shape and provided at their ends with some means whereby the links of adjacent insulators may be connected to form a string. In the present instance the ends of the links are represented as provided with heads 4 for engagement by suitable connecting devices, not shown, for the reason that they form no part of the present invention.

In carrying out the present invention I provide a liner or cushion device designated at 5, which liner is located against the concave side of the link with its ends terminating short of the ends of the link. The passages 2 are substantially circular in cross-section and it is preferable that the links should be of substantially the same shape in cross-section. For this reason I have shown the body of the link 3 as substantially semicircular in cross-section and the liner 5 likewise of the same shape so as to be complementary to the body of the link, the link and the liner together being the same in cross-section as the ordinary type of link which is unprovided with a liner or cushion. However, there is no limitation desired in this respect as the link might be of a different cross-section. As will be pointed out hereinafter the only essential in regard to the link is that the surface of the link to which the liner is applied be not greater than a right angle to the line of pressure.

The liner or cushion is of a ductile nature, of course metallic to withstand the strain, and in actual practice I have discovered that an alloy of substantially ninety-six percent of lead and four percent of antimony is hightly satisfactory inasmuch as it possesses the quality or capacity of "flowing" under strain and consequently accommodating itself to the surface against which it engages.

While it is conceivable that various means might be resorted to for affixing, securing or uniting the liner or cushion to the body of the link, I have found that a convenient method is to heat the link, which may be of steel, iron or copper, or some other suitable similar material, to a temperature of, say 600° F., then place the liner or cushion, which has been previously fashioned to a curved shape to conform to that of link body, against the concave side of the link body and to hold it in place by means of pliers or other suitable clamping device, indicated at 6, subsequent to which some suitable solder is applied to the joint between the body and the liner at opposite sides thereof. The exact manner of applying the solder is immaterial and the extent of the soldered joint is likewise of minor importance though it might be mentioned that a length extending between the points 7 and 8 should be sufficient, it being unnecessary, if not actually inadvisable, to solder the body and the liner together throughout the length of the latter, especially in view of the difference between the coefficients of expansion of the dissimilar metals.

Assuming that the link has been equipped with the liner or cushion, it is apparent that it is used in identically the same manner as the ordinary link and its action will be the same except that the liner will "flow" to accommodate itself to inequalities, such as high and low spots in the link receiving passage, and the strain will be consequently evenly distributed. Owing to the fact that the surface of the link to which the liner is applied is such that it is never greater than a right angle to the line of pressure, it will be clear that when strain is applied there is a tendency to "crowd" the material of the liner toward that surface of the link engaged by it or toward the axis of the link receiving passage, this tendency entirely avoiding any chafing or cutting of the soft or ductile material by the harder material of the link body.

While I have shown and described a preferred embodiment of the invention it should be understood that I reserve the right to make all such changes in the form, construction and arrangement of parts as will not depart from the spirit of the invention or the scope of the subjoined claims.

Having now described my invention, I claim:

1. In combination with a rigid insulator suspension link of concavo-convex shape having its concave side flat across, a liner of ductile metal engaged directly against and conforming to the concave side of the link.

2. In combination with a rigid insulator suspension link of concavo-convex shape having its concave side flat across, a liner of ductile metal engaged directly against and conforming to the concave side of the link, the liner having its concave side curved in cross section for conforming engagement within an insulator link receiving passage.

3. In combination with a rigid insulator suspension link of concavo-convex shape having its concave side flat across, a liner of ductile metal engaged directly against and conforming to the concave side of the link, the liner being substantially semicircular in cross section with its flat side conforming to the flat surface of the link and its convex side adapted to conform substantially to the cross sectional configuration of an insulator link receiving passage, the ductility of the liner permitting it to accommodate itself to inequalities in the insulator surface engaged thereby.

4. An insulator suspension link formed as a curved rigid body adapted to be inserted through a curved link receiving passage in an insulator, said body having its concave side flat across, and a liner united to the concave side of the body and having every point of its surface receding from the edges of the body, the liner being of a ductile metal capable of conforming to irregularities in an insulator surface engaged thereby.

5. An insulator suspension link comprising a curved rigid body substantially semicylindrical in cross section and having its concave side flat across, and a liner of substantially semicircular shape in cross section having its outer surface flat across and united to the flat inner surface of the body, the liner being of ductile metal capable of conforming to inequalities in an insulator surface engaged thereby.

6. An insulator suspension link comprising a curved rigid body member having its inner face flat across and entirely covered by a liner of ductile metal capable of conforming to irregularities in an insulator surface engaged thereby.

7. A suspension link for an insulator of the type having interlinking curved passages substantially circular in cross section, the link comprising a rigid curved body adapted to be inserted through a passage, the body being substantially semicircular in cross section throughout the insulator engaging portion thereof, and a liner of ductile metal secured to the body at the portion thereof located within the passage, the liner covering the flat side of the body and being likewise substantially semicircular in cross section with its convex surface adapted to engage and conform to inequalities in the passage, the assembled body and liner being of substantially the same dimensions in cross section as the link receiving passage to avoid leaving appreciable spaces at the sides of the link which might permit lateral displacement of the liner beyond the sides of the body.

In testimony whereof I affix my signature.

MINOR F. H. GOUVERNEUR.